United States Patent [19]

Franz et al.

[11] Patent Number: 5,026,597
[45] Date of Patent: Jun. 25, 1991

[54] SOLUBLE POLYMER INTERLEAVING MATERIAL

[75] Inventors: Helmut Franz; James H. Hanlon, both of Pittsburgh; Lloyd G. Shick, Natrona Heights, all of Pa.

[73] Assignee: PPG Industries, Inc., Pittsburgh, Pa.

[21] Appl. No.: 77,967

[22] Filed: Jul. 24, 1987

Related U.S. Application Data

[63] Continuation of Ser. No. 481,419, Apr. 1, 1983, abandoned.

[51] Int. Cl.$^5$ .................. B05D 5/00; B32B 17/10; B32B 3/14; B65D 85/48
[52] U.S. Cl. ............................. 428/323; 65/169; 215/12.2; 215/DIG. 6; 427/154; 427/165; 427/180; 427/389.7; 428/327; 428/428; 428/441
[58] Field of Search ............ 428/323, 327, 428, 441; 427/154, 165, 180, 389.7; 215/12.2, DIG. 6; 65/169

[56] References Cited

U.S. PATENT DOCUMENTS

| | | | |
|---|---|---|---|
| 2,853,465 | 9/1958 | Werner | 428/442 |
| 3,577,256 | 5/1971 | Benford | 428/36 |
| 3,712,829 | 1/1973 | Steigelman | 428/442 |
| 3,723,312 | 3/1973 | Hay | 65/24 |
| 3,798,112 | 3/1974 | Hay | 428/442 |
| 4,011,359 | 3/1977 | Simpkin | 428/441 |
| 4,053,666 | 10/1977 | Taylor | 428/442 |
| 4,200,670 | 4/1980 | Albach | 427/202 |
| 4,263,371 | 4/1981 | Franz | 428/432 |
| 4,360,544 | 11/1982 | Franz | 427/180 |

OTHER PUBLICATIONS

Seymour, Modern Plastics Encyclopedia, vol. 53 (1976–1977), pp. 172, 174, 175, 176, 182, 183 and 186.

Primary Examiner—James C. Cannon
Attorney, Agent, or Firm—Donna L. Seidel

[57] ABSTRACT

A method is disclosed providing temporary protection of a glass surface from staining and scratches by coating the exposed surface with a soluble polymer film incorporating spacer particles of an inert material.

17 Claims, No Drawings

SOLUBLE POLYMER INTERLEAVING MATERIAL

This application is a continuation of application Ser. No. 481,419, filed Apr. 1, 1983, now abandoned.

BACKGROUND OF THE INVENTION

The present invention relates generally to the art of protecting glass surfaces from staining and scratches, and more particularly to the art of protecting glass surfaces without permanently altering the glass surfaces.

Hay U.S. Pat. No. 3,723,312 discloses the use of dedusted agglomerated salicylic acid in conjunction with an inert particulate separator material, such as wood flour or polystyrene, to prevent staining of stacked glass sheets. Hay U.S. Pat. No. 3,798,112 discloses agglomerating salicylic acid with polyethylene oxide to produce an interleaving material which further comprises an inert particulate separating material such as wood flour or polystyrene to prevent staining of stacked glass sheets.

Simpkin et al U.S. Pat. No. 4,011,359 discloses an interleaving material for separating glass sheets and protecting them from staining and scratches which comprises a porous, finely divided support material, impregnated with a weakly acidic material, and fine particles of a chemically inert plastic material.

Albach U.S. Pat. No. 4,200,670 describes a method for protecting glass sheets during packing, shipping and storing. The method involves applying water, a stain inhibiting material, and dry, finely divided particles of a mechanical separator to the surfaces of glass sheets prior to stacking them, in a plurality of sequential steps that produce an adherent coating which acts as a protective interleaving between facing glass surfaces when the sheets are stacked.

Franz U.S. Pat. No. 4,263,371 discloses a method for reducing the surface energy of glass by chemisorption of an alkyltin compound at the glass surface. Franz U.S. Pat. No. 4,360,544 discloses a method for protecting the surfaces of stacked glass sheets by chemisorption of an organotin compound on the glass surfaces, and separation of adjacent glass surfaces with an inert interleaving material.

SUMMARY OF THE INVENTION

The present invention provides effective temporary protection to a surface, as well as an interleaving material for protection and separation of adjacent surfaces. The present invention involves forming a soluble polymer film on the substrate surface. The soluble polymer film may further comprise inert, insoluble spacer particles such as polyethylene or acrylic beads, as well as stain inhibitors such as adipic acid, or hydrophobic additives such as chemically reacted colloidal silica. The protective film of the present invention is applied to a substrate surface prior to handling, storage, shipping, installation, and so on to protect the surface from staining, scratches, dirt, fingerprints, and other contaminants. When the substrate has reached its final destination, the soluble protective film is easily removed by ordinary washing procedures.

DESCRIPTION OF THE PREFERRED EMBODIMENTS

Substrates, preferably glass sheets, are provided with temporary protection from staining and scratches by application of a protective film of a soluble polymer. Preferably, glass sheets are contacted with a solution of a water soluble film-forming polymer, and the solvent evaporated to form a water soluble film on a glass surface before the glass is subjected to fabrication, finishing, handling, stacking, storage, transportation or installation. A preferred polymer is polyvinylpyrrolidone, and preferred solvents include water and water miscible alcohols and ketones such as methanol, ethanol, propanol, acetone and methyl ethyl ketone. Suitable application techniques include spraying, dipping and roll coating. The polymer film preferably comprises microsized inert, insoluble organic polymer particles to act as spacer material when glass surfaces are brought together as in stacking for storage or shipment. Preferred polymer spacer materials include polyethylene or acrylic beads.

In one preferred embodiment of the present invention, glass sheets are contacted with a solution of a water soluble film-forming polymer containing inert, insoluble polyethylene particles and hydrophobic colloidal silica. The particles act as spacers when the glass sheets are stacked for storage and shipment. When the glass sheets are installed in architectural applications, the hydrophobic colloidal silica minimizes wetting of the glass surfaces and thereby protects the glass surfaces from staining ordinarily caused by concrete or mortar run-off and other contaminants generally encountered at construction sites.

In a second preferred embodiment of the present invention, where glass sheets are to be silk-screened, a protective film is applied in accordance with the present invention prior to such processing. In this embodiment, the protective film is applied to one surface of the glass sheets, and must not transfer to the opposite surface. In addition, it is preferred that the polymer film-former, as well as the particulate spacer, burn off without residue during a tempering cycle. A preferred protective film in this embodiment of the present invention comprises polyvinylpyrrolidone film and polyethylene particles.

In another preferred embodiment of the present invention where a protective film of water soluble polymer acts essentially as an interleaving material, the polymer film preferably comprises, in addition to particulate spacing material, a stain inhibiting material such as an organic acid. A particularly preferred protective film incorporates polyvinylpyrrolidone as the film-former, polyethylene as the particulate spacer, and adipic acid as the stain inhibitor.

The present invention will be further understood from the descriptions of specific examples which follow.

EXAMPLE 1

A solution is prepared comprising 2 percent polyvinylpyrrolidone and 2 percent interleaving material in propanol. The interleaving material is an equal weight mixture of acrylic beads and adipic acid. This composition is sprayed onto metal oxide coated surfaces of glass sheets. After 11 weeks of exposure at 140.F. and 90 percent relative humidity, the treated glass surfaces show no scum or stain. By comparison, adjacent glass surfaces separated by newsprint exhibit light scum, and adjacent surfaces separated by other conventional interleaving materials show even greater surface deterioration.

EXAMPLE II

A solution is prepared comprising 2 percent polyvinylpyrrolidone, 2 percent polyethylene particles, 2 percent hydrophobic colloidal silica, and 0.2 percent wetting agent (ZONYL-FSN from DuPont) in isopropanol. The composition is sprayed onto metal oxide coated surfaces of glass sheets to protect them from concrete and mortar run-off at construction sites. To test the protection afforded by the soluble film, the treated sheets are placed in a horizontal position and contacted with a cement slurry which is allowed to dry on the coated glass surface. The sheets are then placed in a humidity chamber at 120 F. (48.9° C.) and 100 percent relative humidity for 2 weeks. When the samples are removed from the chamber and washed, the cement washes off and the coated glass surface is clean with no stain.

EXAMPLE III

To protect glass surfaces from staining and scratches prior to silk screening and tempering, a protective film on one surface of the glass is required which will not transfer to an adjacent glass surface, does not interfere with the silk-screening process, and burns off residue-free during the tempering cycle. A suitable protective film is deposited on glass surfaces from a solution of 2 percent polyvinylpyrrolidone, 2 percent polyethylene particles and 0.2 percent wetting agent (ZONYL-FSN from DuPont). This composition is sprayed onto one surface of a number of glass sheets. The protective film formed prevents staining and scratching of the glass, does not transfer to adjacent glass sheet surfaces, can be handled with vacuum equipment, does not interfere with silk screening and burns off residue-free in the tempering cycle.

The above examples are offered to illustrate the present invention, which encompasses various modifications. For example, other soluble polymers may be employed, such as polyvinylalcohols or copolymers of polyvinylpyrrolidone. Other solvents may be used, preferably water or water-miscible ketones and alcohols such as acetone, methyl ethyl ketone, methanol or ethanol. Other inert spacing material may be utilized such as acrylic beads or wood flour. Other optional wetting agents may be employed, as well as other hydrophobic additives. Substrates other than glass may be protected with films in accordance with the present invention, the scope of which is defined by the following claims.

We claim:

1. A method for providing temporary protection to a sheet surface comprising the steps of:
   a. contacting said surface with a solution comprising
      1. a water-soluble film-forming polymer; and
      2. microsized inert, insoluble particles, wherein said particles act as spacers when said sheet is stacked;
   b. evaporating the solvent to form a water soluble film of polymer containing insoluble spacer particles on the sheet surface; and
   c. subsequently removing said film by contacting the coated surface with water thereby dissolving said water soluble film.
2. The method according to claim 1 wherein the substrate is glass.
3. The method according to claim 1, wherein the polymer is selected from the group consisting of polyvinylpyrrolidone, polyvinylalcohol and copolymers thereof.
4. The method according to claim 3, wherein the solvent is selected from the group consisting of water and water-miscible alcohols and ketones.
5. The method according to claim 4, wherein the polymer is polyvinylpyrrolidone.
6. The method according to claim 5, wherein the solvent is isopropanol.
7. The method according to claim 6, wherein the solution further comprises a wetting agent.
8. The method according to claim 7, wherein the inert spacer particles comprise a material selected from the group consisting of polyethylene and acrylic beads.
9. The method according to claim 8, wherein the film further comprises a hydrophobic additive.
10. The method according to claim 9, wherein the hydrophobic additive is hydrophobic colloidal silica.
11. An article of manufacture comprising a sheet selected from the group consisting of glass and polymeric materials, and disposed on a surface portion of said sheet, a protective coating comprising a water-soluble polymeric film and insoluble inert particles, wherein said particles act as spacers when said sheet is stacked.
12. An article according to claim 11, wherein the substrate is glass.
13. An article according to claim 12, wherein said polymer is selected from the group consisting of polyvinylpyrrolidone, polyvinylalcohols and copolymers thereof.
14. An article according to claim 13, wherein the polymer is polyvinylpyrrolidone.
15. An article according to claim 13, wherein the inert spacer particles are selected from the group consisting of polyethylene and acrylic beads.
16. An article according to claim 15, wherein the coating further comprises an organic acid stain inhibiting agent.
17. An article according to claim 15, wherein the coating further comprises a hydrophobic compound.

* * * * *